United States Patent [19]

Bolitho

[11] 3,827,423

[45] *Aug. 6, 1974

[54] UNITARY CELLULAR-STRUCTURED COOKING FIRE APPARATUS

[76] Inventor: Walter J. Bolitho, 30005 W. Thirteen Mile Rd., Farmington, Mich. 48024

[ * ] Notice: The portion of the term of this patent subsequent to Feb. 1, 1989, has been disclaimed.

[22] Filed: July 5, 1972

[21] Appl. No.: 269,123

[52] U.S. Cl..................... 126/29, 126/25 R, 126/41
[51] Int. Cl. ............................................. A47j 37/07
[58] Field of Search................ 126/29, 30, 25 R, 41; 99/447

[56] References Cited
UNITED STATES PATENTS
2,746,378   5/1956   Lang............................. 126/25 R X
3,638,634   2/1972   Bolitho............................. 126/41 R Primary Examiner—Carroll B. Dority, Jr.
Assistant Examiner—Harold Joyce
Attorney, Agent, or Firm—Russel C. Wells

[57] ABSTRACT

A unitary cellular structured cooking-fire appliance having dual compacted volumes of trap rock separated by a convection chamber is positioned broadside over a primary source of heat for cooking the edibles. The upper portion or cell of the dual compacted volumes of trap rock provides both a substantially uniform temperature cooking surface and a noncombustible collector and absorber of liquid animal fats and the lower spaced apart portion or cell of trap rock is capable of being heated to incandescence, is positioned over the primary source of heat for acting as a distributor of the heat generated from the primary source of heat to the whole area of the cooking surface.

3 Claims, 6 Drawing Figures

PATENTED AUG 6 1974  3,827,423

UNITARY CELLULAR-STRUCTURED COOKING FIRE APPARATUS

FIELD OF THE INVENTION

This invention relates to cooking apparatus in general and more particularly to an improvement in cooking apparatus by means of improved heat distribution to the cooking surface.

PRIOR ART

In the field of barbecuing or broiling over an open fire or any incandescent surface, the surface temperature at the primary source of heat is usually at a temperature that is high enough to ignite any animal fat or grease, which are basically a form of hydrocarbons, that are allowed to come in contact with the source of heat. The resulting flare-up of flame is hazardous to any nearby object and if allowed to continue unchecked, may well burn and ruin the food being prepared. Additionally, burning fat or grease usually emits an acrid eyeirritating smoke that it objectionable to anyone in the vicinity.

Generally this flare-up results from the solid animal fat being transformer into a liquid grease which is then allowed to drip directly on or into the primary source of heat. Several prior art grills have attempted to avoid these above enumerated difficulties by covered grills wherein the amount of outside air admitted to the fire box is controlled. Grease collection grills in open grills are generally tiltable members positioned in an inclined planes extending toward a trough. The theory being that the fat when it turns to liquid is heavy enough to adhere to the grill and flow along the grill in the direction of the incline and drip into the trough. In this manner, a substantial portion of the grease should not reach the source of heat. The trough then directs the flow of grease, as long as it remains liquid and does not solidify, to a receptacle which may be removed and cleaned after the cooking is complete.

SUMMARY OF INVENTION

It is an object of the invention to provide a substantially uniform heating surface having an area much greater than the area of the fire or source of heat.

It is another object of the invention to prevent the flow of grease from an edible to the fire thereby preventing a hazardous flare-up flame.

It is another object of the invention to provide a cooking surface which does not become luminous or incandescent.

It is still another object of the invention to provide an appliance that can be used with any type of cooking fire or source of heat for releasing from the appliance in the form of an enveloping light vapor the low boiling point hydrocarbons contained in the edibles being cooked and retaining therein the higher boiling point hydrocarbons for delayed disposition by incineration.

It yet another object of the invention to provide an appliance that is self cleaning without the need for manual effort or the application of cleaning agents or other chemicals.

In accordance with the above enumerated objects and other objects as will hereinafter be made clear, this is provided an unitary cellular-structured cooking fire appliance having four parallel spaced apart perforated broadsides surfaces interconnected around their perimeter by a continuous enclosed surface. Between the first and second and the third and fourth broadside surfaces and within the perimeter surface there is contained equal volumes of compacted fragments of porous trap rock. Between the second and third broadside surfaces there is a convection chamber. The two outside broadside surfaces are adapted to be used as cooking surfaces upon which foods or other items to be cooked are placed. The outside broadside surface which is not being used as a grilling surface is positioned to directly receive heat energy from a source of heat positioned in communication therewith.

DETAILED DESCRIPTION

Figure 1:
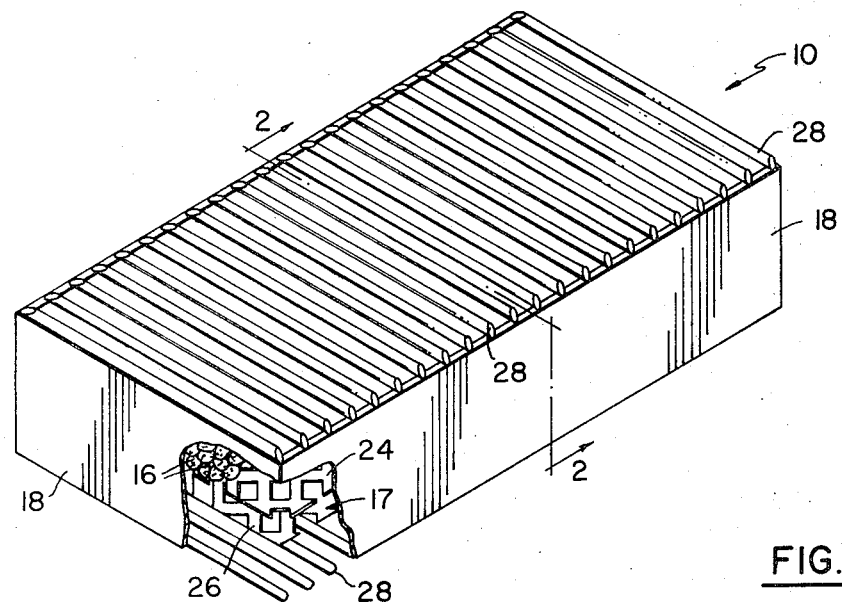
FIG. 1 is a perspective view of the unitary cooking fire appliance of the present invention.

Referring to the figures by the characters of reference herein illustrated in FIG. 1 a perspective view of the unitary cellular-structured cooking fire appliance 10 according to the present invention. The appliance comprises a pair of spaced apart cells or housings 12 and 14 containing equal compacted volumes of fragmented trap rock 16 forming a convection chamber 17 there between. The means containing the structure in the preferred embodiment has solid sides 18 to contain and direct the flow of heat between the outside broadside surfaces 20 and 22.

Each housing or cell 12 and 14 of compacted volume of fragmented trap rock is contained between two spaced apart broadside surfaces 20–24 and 22–26. The inner surfaces 24 and 26 are formed of perforated metal to allow heat transfer and containment of the trap rock bodies. The two outer surfaces, 20 and 22 in the preferred embodiment, are formed from a welded unit of parallel spaced apart tubular members 28, forming a continuous grilling surface. They may however be of perforated metal similar to the inner surfaces.

The housing 12 and 14 are spaced apart forming the convection chamber 17 between the units. In the preferred embodiment the depth of the chamber 17 is approximately equal to 40 percent of the depth of each unit of trap rock volume. This depth is not critical but the depth must be of uniform height.

The function of the chamber 17 is to prevent the transfer of heat by conduction from one volume or cell of trap rock to the other. It does however permit heat to be exchanged between the cells by means of radiation and convection. By this means the upper cell of trap rock is prevented from becoming incandescent and thus unable to initiate ignition of the greases absorbed in its mass.

Figure 2:
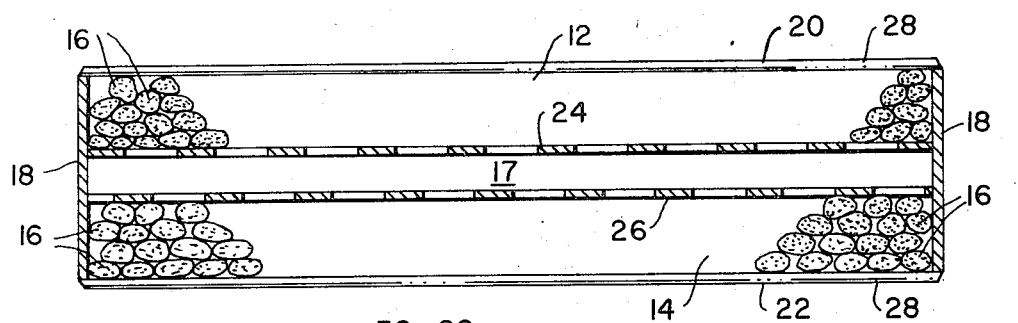
FIG. 2 is a sectional view taken along line 2—2 of FIG. 1.

FIG. 2 is a sectional view taken along line 2—2 of FIG. 1 and illustrates the four broadside parallel surface 20, 22, 24 and 26 dividing the unitary structure into the two housing 12 and 14 defined by the volume of trap rock 16 between the first 20 and second 24 and the third 22 and fourth 26 surfaces. Each housing contains a compacted volume of fragmented trap rock. The first 20 and fourth 22 surfaces, as stated above, are grill work surfaces forming cooking surfaces. The second 24 and third 26 surfaces, on either side of the chamber 17, are perforated metal surfaces. The side walls 18 are generally solid to retain and direct the heat flow between the first and fourth broadsides. Due to symmetry of structure either cell 12 or 14 is capable of being heated to incandescence without impairment. Only the relative position of the appliance determines which cell is serving as the heat distributor and which is serving as a grease collector at anyone time.

Figure 3:
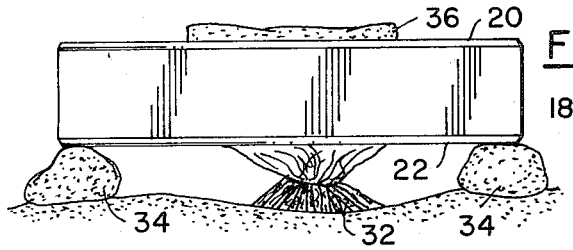
FIG. 3 is a plan view of the appliance as may be used over a campfire.

The unitary structure may be utilized with many different types of cooking fires. FIG. 3 illustrates the structure 10 placed over a campfire of wood 32 and supported by a plurality of rocks 34 or stones. On the top surface with reference to the Figure is placed the food 36 to be cooked.

Figure 4:
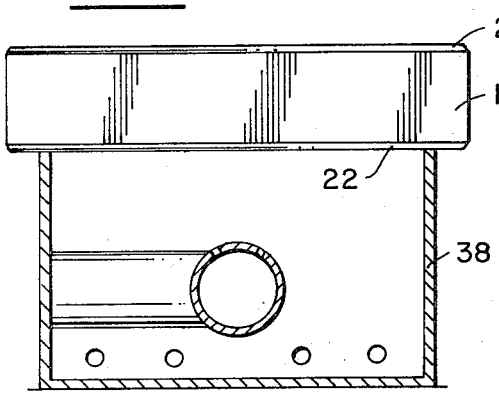
FIG. 4 is a sectional plan view of the cooking fire appliance positioned on a gas fired broiler.

FIG. 4 illustrates the use of the unitary structure 10 placed over a conventional gas fired broiler 38. If the broiler is structured to support the unitary structure 10 within the housing, the danger of accidently knocking the structure off the broiler will be lessened. An example of such a broiler may be found in U.S. Pat. No. 3,638,634.

Figure 5:
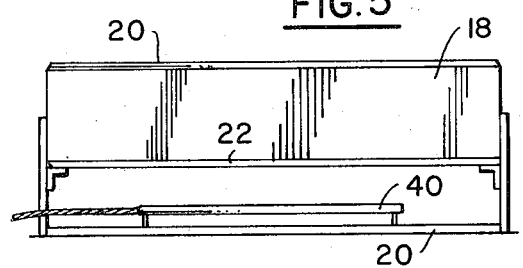
FIG. 5 is a sectional view of the cooking fire appliance positioned over an electric resistance type heating element.

FIG. 5 illustrates the unitary structure 10 supported over a resistance type electric heating element 40. Previously electric elements were not usable because of the fat falling on the elements would eventually destroy the element. The cellular structure of the present appliance prevents this from happening.

Figure 6:
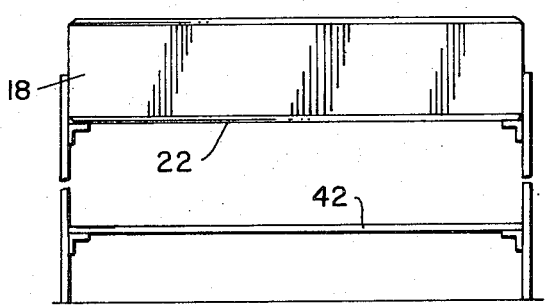
FIG. 6 is a plan view of the cooking fire appliance positioned over a supporting structure of indeterminate height and material.

FIG. 6 illustrates the unitary structure supported on a multilevel framework of indeterminate height and material. When supported on such a frame, any of the heat sources illustrated in FIGS. 3 through 5 that are of the portable type may be used interchangeably as a fuel or heat source. In fact, any source of heat energy is usable, even a fire of such an elemental nature as rolled up newspaper is satisfactory. A support plate 42 may be positioned at any convenient height for supporting the fuel.

The unitary structure permits any grease or fats which are reduced to liquid to drip down into the upper cell of fragmented trap rock. The light hydrocarbons are immediately driven off in the form of a vapor which then rises to envelope the edible being cooked maintaining the satisfying aroma of barbecue cooking while the heavy hydrocarbons are entrapped in the trap rock to be disposed of at a later time by incineration. Due to both the compactness of the trap rock and more particularly the chambers 17 seperating the two rock volumes, the primary source of heat cannot ignite the liquid fats or grease to cause a hazardous flare-up of flame.

The symmetry of the unitary cellular structure also makes it possible to clean the structure by "burning off" the fats and greases that accumulated during a cooking cycle. The structure is "flipped over" to bring the grease laden cooking surface and cell trap rock in a position directly over the primary heat source. In this position the direct heat causes the fats to reach their ignition temperature and results in their removal by incineration. There is some heavy but short-lived "smoke" formed at this time and the user is instructed to select a suitable time and place for conducting this operation. The light ash that forms is wafted away on the thermal currents created by the heat. This operation gives rise to the self cleaning aspect of the appliance allowing the appliance to be sterilized and made clean without the need for manual effort or the application of cleaning agents or other chemicals. Since this operation is generally completed before the upper rock pack or cell is ready for cooking, this smoke is not offensive.

While the cooking appliance has been illustrated as a enclosed integral structure having a rectangular cross section, it has been found that any enclosed integral structure having any cross sectional shape is suitable. For custom installation a cooking appliance having a cross sectional shape conforming to the fire-box structure would function very satisfactorily.

There has thus been described a unitary cellular structured cooking appliance having a pair of spaced apart compacted volumes of trap rock. Each volume of trap rock is contained between a grilling surface comprising a plurality of tubular spaced apart members and a perforated metal broadside parallel surface. These compacted volumes are spaced apart by a convection chamber and contained within a housing of substantially solid sides.

What is claimed is:

1. An unitary cellular structured cooking appliance for use over a source of heat, said cooking appliance comprising:

four substantially parallel spaced apart substantially perforated members, means enclosing the perimeter of said perforated members forming a unitary integral structure, said means cooperating with said members defining three chambers in a stacked overlying relationship having two outside chambers with a convection chamber therebetween and a first and second compacted volume of trap rock bodies contained respectively in said two outside chambers, wherein said outside chamber nearest the source of heat is capable of being heated to incandescence for the distribution of heat by radiation and convection across said convection chamber to the other outside chamber to be dispersed therein for supplying a uniform heating surface on the outside perforated member of said other outside chamber.

2. The cooking appliance according to claim 1 wherein the outside members comprises a plurality of parallel spaced apart tubular members extending in the direction of the width of said members forming a surface adaptable for grilling.

3. The cooking appliance according to claim 1 wherein the depth of said convection chamber is less than the depth of said outside chambers.

* * * * *